United States Patent [19]

Kershaw, Jr.

[11] 4,001,651

[45] Jan. 4, 1977

[54] STATION LIGHTNING ARRESTER WITH DUAL RUPTURE DIAPHRAGMS FOR GAS PRESSURE RELEASE

[75] Inventor: Stanley Scott Kershaw, Jr., Greendale, Wis.

[73] Assignee: McGraw-Edison Company, Elgin, Ill.

[22] Filed: May 5, 1975

[21] Appl. No.: 574,410

[52] U.S. Cl. .................................. 317/61; 317/68; 317/70

[51] Int. Cl.$^2$ .......................................... H02H 3/22

[58] Field of Search ............ 317/61, 70, 68; 315/36

[56] References Cited

UNITED STATES PATENTS

| | | | |
|---|---|---|---|
| 2,593,955 | 4/1952 | Ackermann | 317/70 |
| 3,096,461 | 7/1963 | Grundmark | 317/70 |
| 3,588,578 | 6/1971 | Clinkenbeard | 315/36 X |

*Primary Examiner*—Harry Moose
*Attorney, Agent, or Firm*—Jon Carl Gealow

[57] ABSTRACT

A surge arrester comprising a porcelain body, top and bottom pieces. The porcelain body is hollow and contains gap assemblies in series with negative temperature coefficient resistance blocks. The entire column is resiliently mounted so as to center the assembly. The top terminal of the surge arrester has a solid plate and a dished metal diaphragm which will rupture under predetermined conditions. The diaphragm is in communication with a passageway cast in the top cast metal end piece. Similarly the bottom end piece is in electrical connection with the gap assemblies and negative temperature coefficient resistance blocks and also has cast therein a gas passageway which is in communication with another dished metal diaphragm.

This is all arranged so that the gases may freely exit without forming a dam in the passageways thereby appreciably decreasing the probability of violent rupture of the surge arrester body during the passage of power fault current.

Also the bottom end piece and the top end piece of the surge arrester are so arranged so that if the pressure becomes excessive they will blow off and relieve the same.

10 Claims, 6 Drawing Figures

FIG. 1
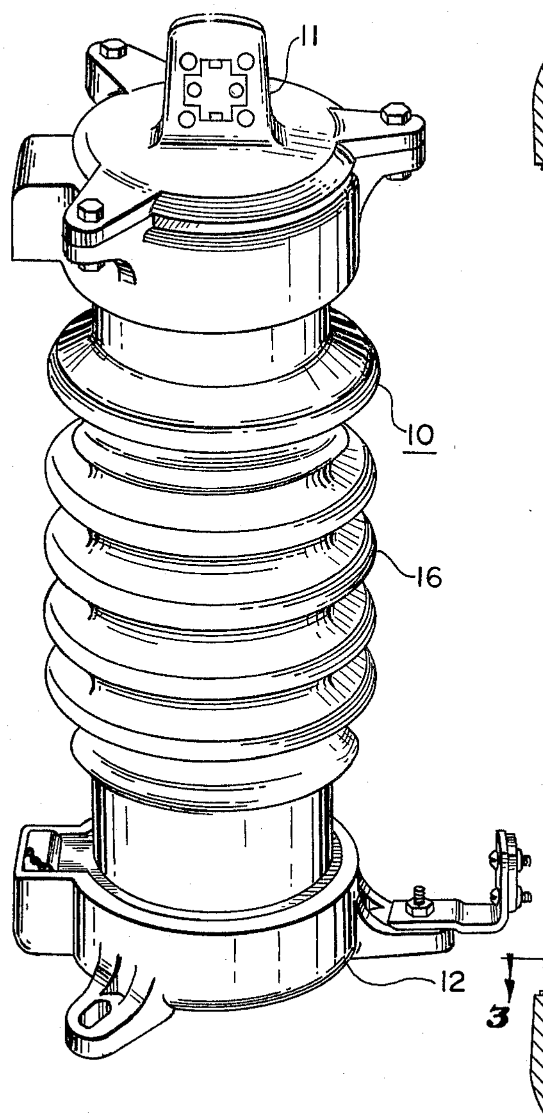
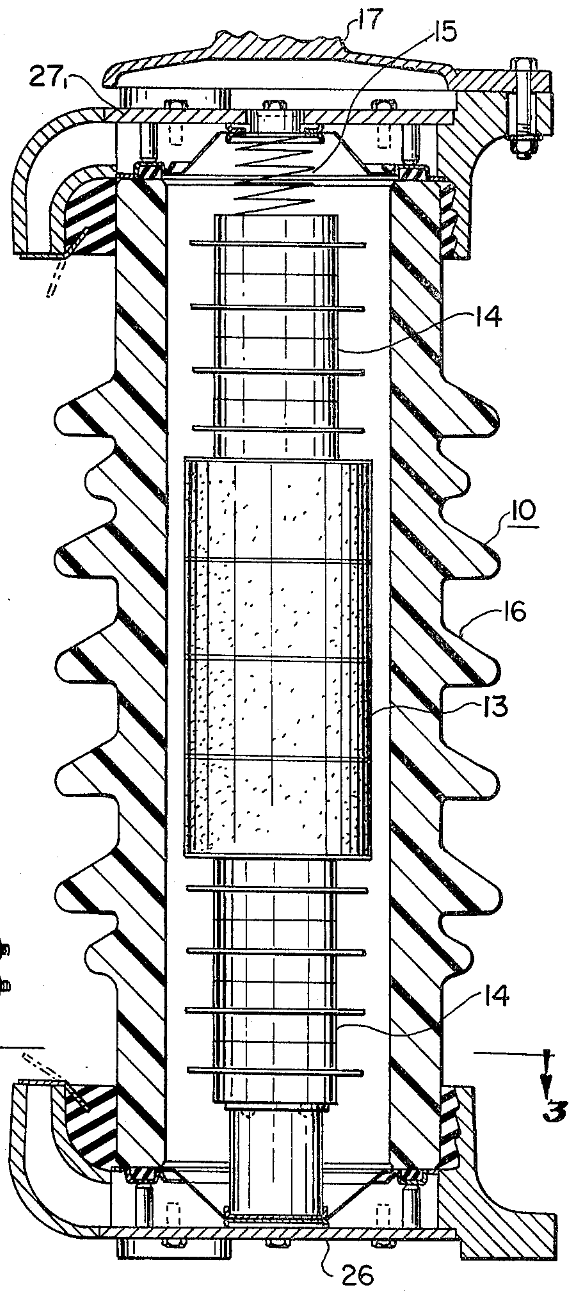
FIG. 2
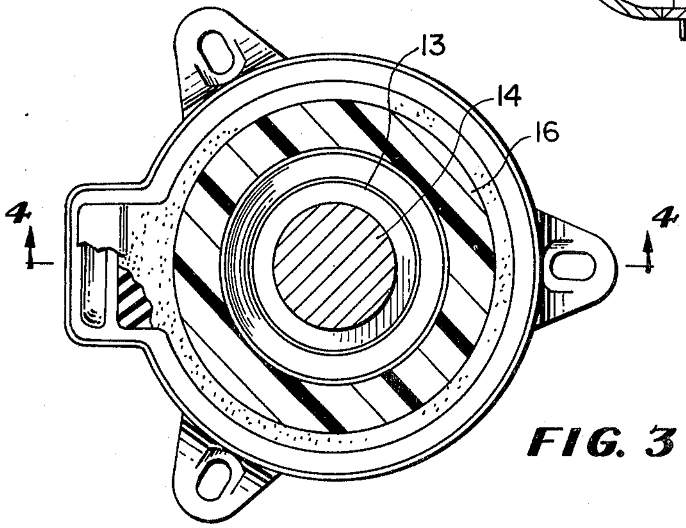
FIG. 3

FIG. 4
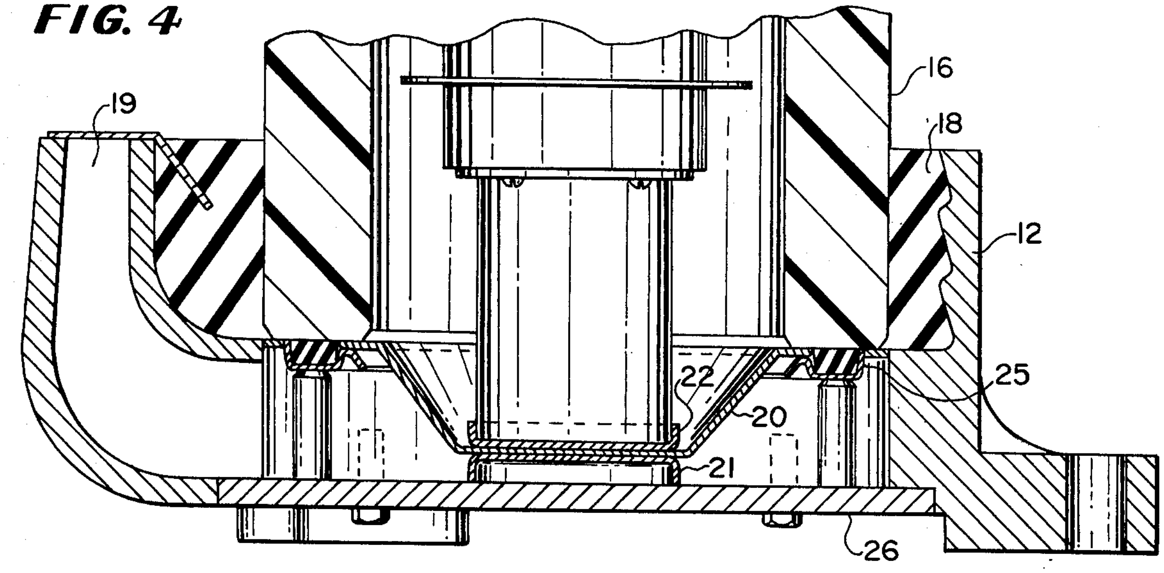
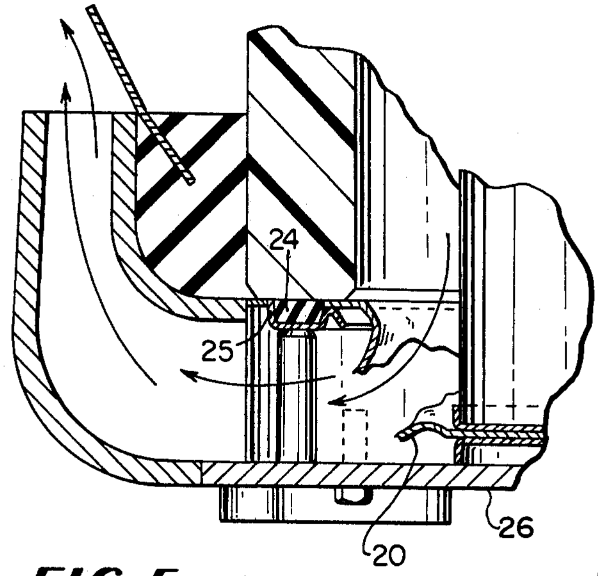
FIG. 5
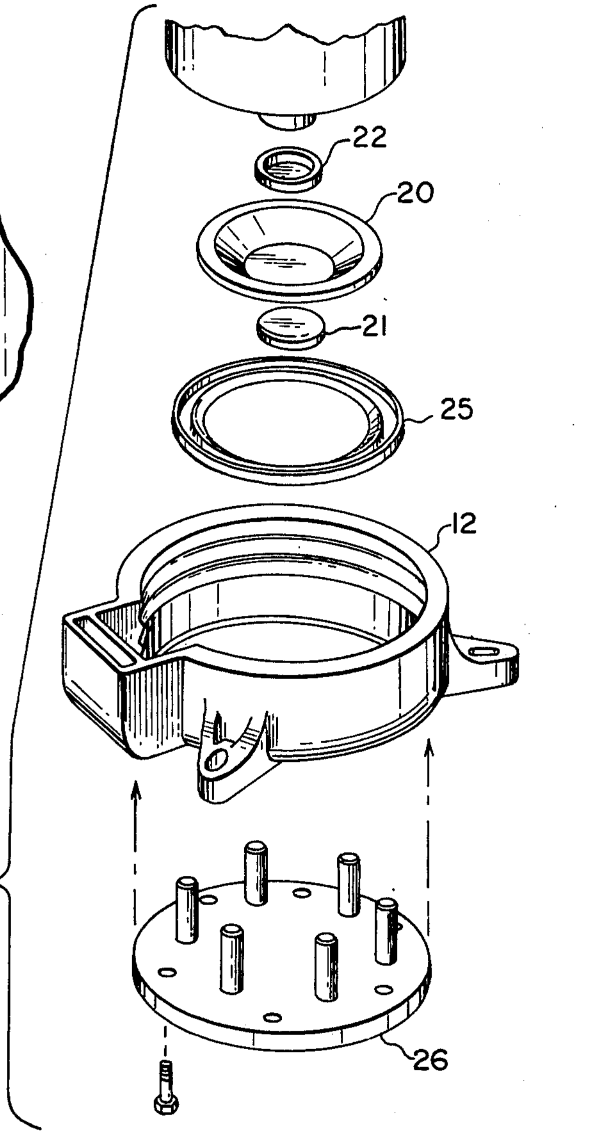
FIG. 6

STATION LIGHTNING ARRESTER WITH DUAL RUPTURE DIAPHRAGMS FOR GAS PRESSURE RELEASE

OBJECTS OF THE INVENTION

A principal object of the present invention is to provide a station valve type surge arrester in which the danger of shattering or explosion is minimized in case of operation of the arrester. It is also another object of the invention to provide vent ports in the body of the surge arrester to be directed away from sensitive apparatus in a substation so as not to damage other equipment. Another object of the invention is to provide that extra bit of safety so that if pressure within the porcelain arrester becomes excessive other means come into function which further minimizes the possibility of violent rupture of the arrester body.

Other objects and advantages of the invention will be apparent from the following detailed description taken in conjunction with the following drawings in which:

FIG. 1 is a front view of the arrester;

FIG. 2 is a front view of the arrester being cut away to show the internal structure of the same;

FIG. 3 is a sectional plane view taken along the lines 3—3;

FIG. 4 is a partial sectional view taken along the line 4—4 of FIG. 3;

FIG. 5 is a corner of FIG. 4 showing the pathway of the explosive gases when the metal diaphragm ruptures;

FIG. 6 is an exploded view of the portion of the arrester shown in FIG. 4.

DESCRIPTION OF THE PREFERRED EMBODIMENT

Referring to FIG. 1 there is shown a station type surge arrester 10 with a line terminal 11 and a ground terminal 12. The body of the arrester is of porcelain having petticoat flanges to increase the creepage distance from 11 to 12. FIG. 2 shows a cross sectional view with the column of negative resistance blocks 13 shown schematically and with the gaps and grading resistors 14 shown schematically. It is to be noted that the entire column is centered in the hollow body of the porcelain 10 and that the assembly of resistors and gaps and blocks are resiliently compressed by a spring 15.

FIG. 4 shows a cutaway view of the bottom portion of the station surge arrester. The cast metal piece 12 is cemented to the body of the porcelain housing 16 by means of cement 18. The gas channel 19 is clearly visible and a metal diaphragm 20 is also clearly visible. The diaphragm 20 rests on a diaphragm support 21 and an upper diaphragm support 22 also rests on said diaphragm. The upper diaphragm support 22 encompasses the lower portion of the arrester which concentrically nests within said support 22.

The diaphragm is further sealed by action of a gasket 24 backed up by a ring 25 and has a six-point contact with the final closure plate 26. The structure on the top side of the arrester is identical to the lower structure. The spring 15 however sets within the diaphragm support member.

You will note that the line terminal member 11 is held to the cast metal top member by means of bolts. However, there is ample air space between the top member and the plate 27.

The operation of the device on low pressures is dramatically illustrated in FIG. 5 which shows the metal diaphragm 20 which is on a bias so as to free itself and free the pieces when it blows open and the arrows show the escape of the gas. This, of course, also happens on the top end of the surge arrester. Also, vented gases leaving the vent ports are directed towards each other causing the fault current arc within the arrester to transfer to the outside, thus preventing further internal pressure buildup. If, during the time the arc transfer is taking place, the rupture strength of the porcelain body is approached due to extreme pressure developed by exceptionally high magnitude fault currents then in addition to the metal diaphragms opening as indicated, the pressure plates 27 and 26 open up relieving the excessive pressure. This reduces the possibility of the surge arrester exploding before arc transfer occurs and sending dangerous projectiles in all directions about a substation.

Having thus described the preferred embodiment of the invention, the invention should not be limited in any way except by the clear import of the following claims.

I claim:

1. A surge arrester comprising a hollow porcelain body, top and bottom pieces sealing said porcelain body, gap assemblies in series with negative resistance elements, said gap assemblies and negative temperature coefficient resistance elements centered in said porcelain body, a top terminal of the surge arrester having a solid plate and a dished metal diaphragm sealed to seal off said hollow core of said surge arrester, the dished metal diaphragm in communication with a passageway cast in the top end piece of said surge arrester, the bottom end of said surge arrester having a dished metal diaphragm sealing said gap assemblies and negative resistance elements, said dished metal diaphragm in communication with a passageway whereby the gases may be freely vented on rupture of the dished metal diaphragm, a bottom end piece affixed to the bottom sealing portion of said surge arrester arranged to blow off on a buildup of excessive pressure within the surge arrester.

2. A surge arrester according to claim 1 in which the top sealing plate of said surge arrester is arranged to blow off and freely vent the surge arrester on the buildup of excessive pressure.

3. A surge arrester according to claim 1 in which the column within the surge arrester of series connected spark gaps and negative coefficient resistance elements is resiliently mounted and centered within said surge arrester.

4. A surge arrester according to claim 1 in which the top and bottom pieces are fixed to the top and bottom end pieces in such a fashion as to blow off when the pressure within the surge arrester is not sufficiently relieved by the rupture of the dished metal diaphragms.

5. A surge arrester comprising a hollow porcelain body, gap assemblies mounted in said hollow porcelain body top and bottom pieces assembled to opposite ends of said porcelain body in a sealing relationship thereto, at least one of said top and bottom pieces have a solid plate and a dished metal diaphragm secured thereto, said dished metal diaphragm sealing one end of said hollow body, said piece having a passageway formed therein extending from said metal diaphragm, said diaphragm rupturing upon the reaching of a predetermined pressure of arc gases in the hollow porcelain body due to arcing, and releasing said arc gases which are confined by said solid plate through said passageway to atmosphere, in the direction of the other one of said top and bottom pieces, to establish said arc outside said hollow porcelain body between said top and bottom pieces.

6. The surge arrester set forth in claim 5 wherein if the pressure of said arc gases exceeds a second predetermined pressure greater than said first predetermined pressure, said solid plate is moved to permit more rapid release of said arc gases.

7. The surge arrester set forth in claim 5 wherein both said top and said bottom pieces are provided with a solid plate and a dished metal diaphragm, and upon rupturing of both of said diaphragms said arc gases are directed toward each other outside said hollow porcelain body to establish an arc outside said hollow porcelain body.

8. The surge arrester set forth in claim 7 wherein if the pressure of said arc gases exceeds a second predetermined pressure greater than said first predetermined pressure, both of said solid plates are moved to permit more rapid release of said arc gases.

9. The surge arrester set forth in claim 5 wherein said gap assemblies are resiliently mounted within said hollow porcelain body and support from said top and bottom pieces.

10. The surge arrester set forth in claim 5 wherein negative temperature coefficient resistance members are connected in series with said gap assemblies.

* * * * *

UNITED STATES PATENT AND TRADEMARK OFFICE

CERTIFICATE OF CORRECTION

PATENT NO. : 4,001,651

DATED : January 4, 1977

INVENTOR(S) : Stanley Scott Kershaw, Jr.

It is certified that error appears in the above-identified patent and that said Letters Patent are hereby corrected as shown below:

Column 2, line 27, after "negative" insert -temperature coefficient-;

line 37, after "negative" insert -temperature coefficient-;

line 50, after "negative" insert -temperature-

Signed and Sealed this

*fifth* Day of *July 1977*

[SEAL]

*Attest:*

RUTH C. MASON
*Attesting Officer*

C. MARSHALL DANN
*Commissioner of Patents and Trademarks*